Patented Oct. 18, 1927.

1,645,599

UNITED STATES PATENT OFFICE.

NEIL M. JONES, OF LOS ANGELES, CALIFORNIA.

RADIOACTIVE ADHESIVE PLASTIC COMPOSITION.

No Drawing.   Application filed December 15, 1925. Serial No. 75,626.

Compositions emitting radio-active rays are now used to form linings for various kinds of containers, in order to impart radio activity to substances placed in such containers and capable of absorbing radio-active rays. Heretofore, it has been necessary in forming these linings, etc., to apply radium ore as a thick paste to the container and to roast it thereon to make it adhere, when dry to the container walls; it has never before been applied in the form of a plaster or cement capable of adhering closely, when dried, to the surface over which it was spread. Because of the earthy nature of the radium ores, it has not been found possible to mix it with any of the ordinary water-setting cements (such as Portland cement), so as to form a water-resisting radio-active composition which could be applied as a cement plaster to any other solid body, or be moulded, to retain a given shape when dried. So far as is known, all previous attempts to obtain such a plaster or cement have resulted in solids the particles of which were so loosely held together as to be easily separated by washing with water.

The object of my invention is the production of a cement with which radio-active material may be mixed to form a plastic composition; which can be applied as a plaster in layers of any desired thickness to many substances and to adhere closely thereto when dried, and which can be readily moulded into any desired shape. It will adhere to practically all the commonly used metals, woods, leather, cloth, etc., and may therefore be used not only to line containers for holding matter to be subjected to the action of radio-active rays emitted from the lining, but may also be spread on a sheet of cloth or other flexible material to be secured to the body of a person to serve as a remedial agency for various ills. In brick form, it can be dropped into water coolers, tanks, etc., to invigorate or impart radioactive properties to any material capable of absorbing radioactive rays and placed therein.

My composition consists of a mixture of magnesium oxide, a radium ore, such as carnotite, pitch blende, radium sulphate, etc.; and magnesium chloride.

In preparing the composition, I prefer to form the plaster with about one part of magnesium oxide to four times its weight of radium ore and a twenty degree Baumé solution of magnesium chloride sufficient in quantity to form a plastic composition of any desired degree of fluidity. These proportions can be varied between very wide limits and still produce a satisfactory composition. However, the magnesium oxide should not be less than one-sixteenth the weight of the radium ore.

The magnesium chloride should be mixed with water to form the twenty degree Baumé solution, which should then be mixed with magnesium oxide sufficient in quantity to form, with its proportionate quantity of radium ore, a plaster of any desired consistency. The radium ore is then thoroughly beaten into the fluid mixture of magnesium oxide and magnesium chloride to form the radio-active plastic composition, which is then in condition to be poured into moulds or plastered on any desired surface and left to dry out and set.

Whether any of the elements of the radium ore enter into chemical combination with any of the other elements of the composition is not known. The radio-active elements are, however, retained in the composition, and any substance capable of absorbing radio-active rays and exposed to this composition, exhibits properties indicating absorption of such rays. For about a period of five or six months after the coating of a container with this composition, bacteria in a liquid placed in such container are destroyed; the bacteria destroying effect being greatest while the coating is fresh, and gradually lessening during a period of about five or six months until it disappears altogether.

I claim:—

1. An adhesive plaster consisting of magnesium oxide, magnesium chloride, radio-active material and water.

2. An adhesive plaster consisting of not less than one part of magnesium oxide mixed with sixteen times its weight of radio-active material and a solution of magnesium chloride.

3. An adhesive plaster consisting of one part of magnesium oxide mixed with four times its weight of radio-active material and a twenty degree Baumé solution of magnesium chloride.

4. An adhesive plaster consisting of four parts of carnotite to one part of magnesium oxide, by weight, and a twenty degree Baumé solution of magnesium chloride.

5. An adhesive plaster which, when dried, forms an unglazed porous solid consisting of a radium ore mixed with a magnesium cement.

6. An adhesive plaster which dries into an unglazed solid consisting of a radium ore mixed with a cement formed of magnesium oxide and magnesium chloride.

In testimony whereof I have signed my name to this specification.

NEIL M. JONES.